United States Patent [19]

Newnham

[11] 4,379,813
[45] Apr. 12, 1983

[54] PROPELLERS AND WINDMILLS

[76] Inventor: John H. Newnham, 20 Village Ave., Doncaster, 3108 Victoria, Australia

[21] Appl. No.: 155,936

[22] Filed: Jun. 3, 1980

[30] Foreign Application Priority Data

Jun. 6, 1979 [AU] Australia .............. PD 9079

[51] Int. Cl.³ .............................. B64C 11/20
[52] U.S. Cl. ....................... 428/587; 46/53; 46/57; 416/223 R; 416/DIG. 3; D12/214; 46/82
[58] Field of Search ............ 416/DIG. 3, 2.3 R, 2.34, 416/2.43, 243 A, 223 R; 428/587; 46/82, 53, 57, 58; D12/214

[56] References Cited

U.S. PATENT DOCUMENTS

| | | | |
|---|---|---|---|
| 1,851,806 | 3/1932 | Brown | 46/53 |
| 2,972,481 | 2/1961 | Shapiro | 46/58 |
| 2,996,120 | 8/1961 | McGregor | 416/DIG. 3 |
| 3,252,241 | 5/1966 | Gould | 46/58 |
| 4,060,338 | 11/1977 | Macauley | 416/DIG. 3 |

FOREIGN PATENT DOCUMENTS 18578 of 1909 United Kingdom ......... 416/DIG. 3

*Primary Examiner*—Brooks H. Hunt
*Attorney, Agent, or Firm*—Manfred M. Warren; Robert B. Chickering; Glen R. Grunewald

[57] ABSTRACT

The present invention provides a propeller or windmill blank comprising a planar sheet of material having markings defining, or being shaped to have, a central or hub region and two blades extending in opposite directions along imaginary lines; and wherein the blank has a marking or line of preferential folding inclined to the first mentioned lines which, when the blank is bent therealong, will result in pitch being applied to the blades.

22 Claims, 39 Drawing Figures

U.S. Patent   Apr. 12, 1983   Sheet 1 of 4   4,379,813
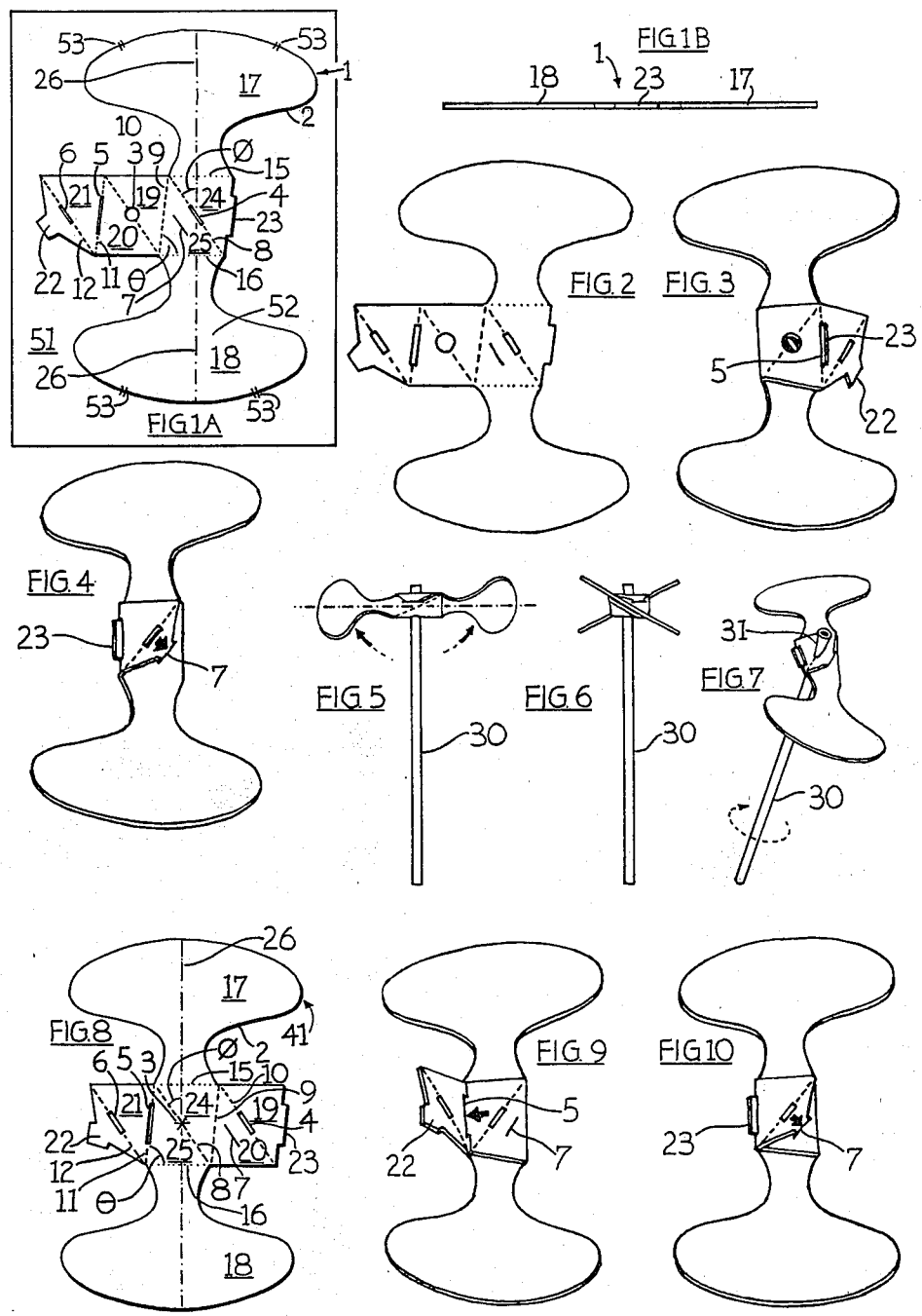

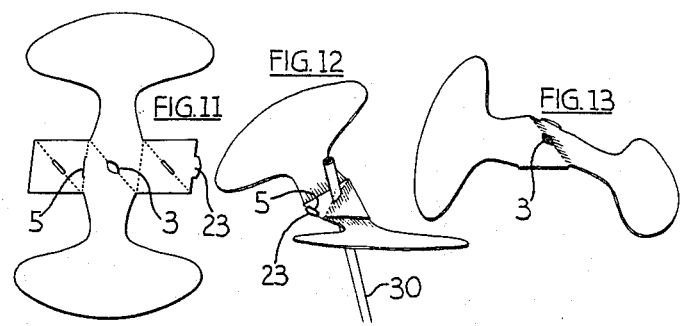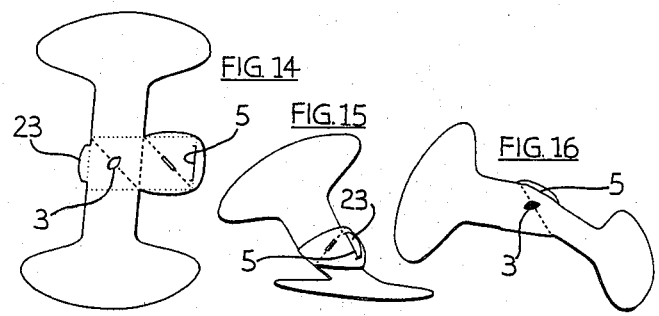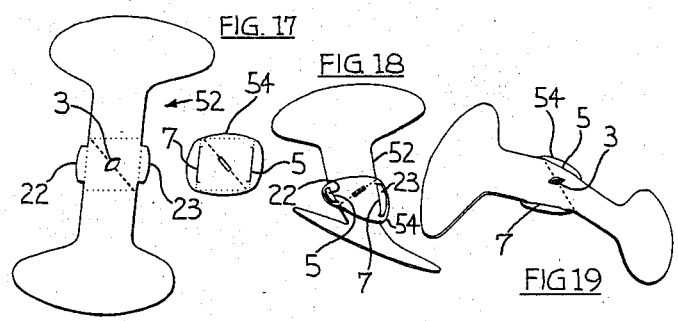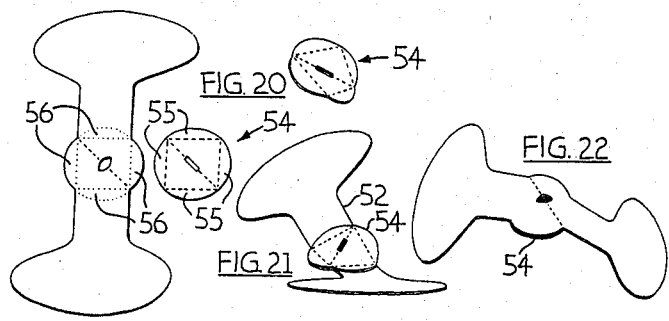

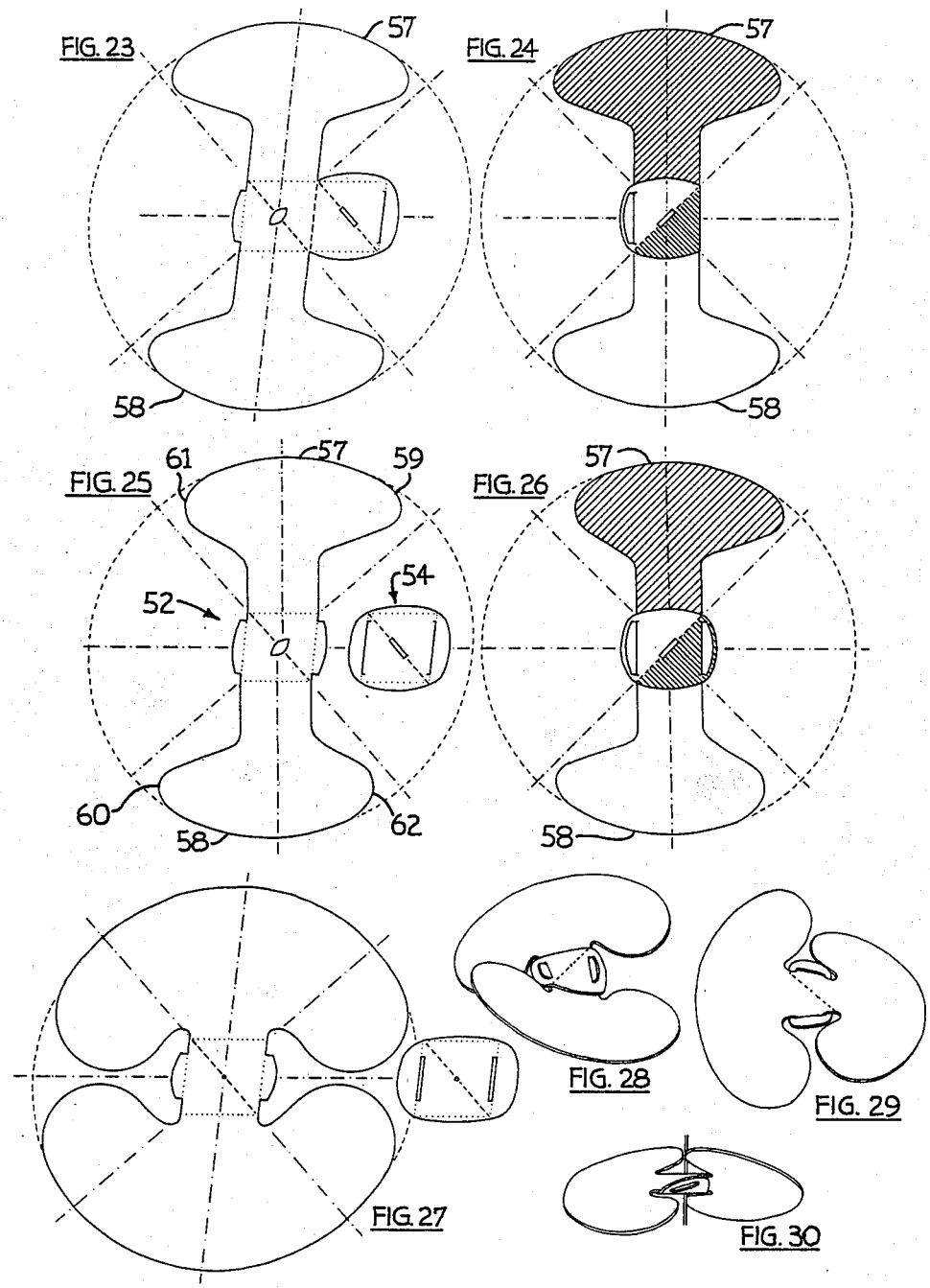

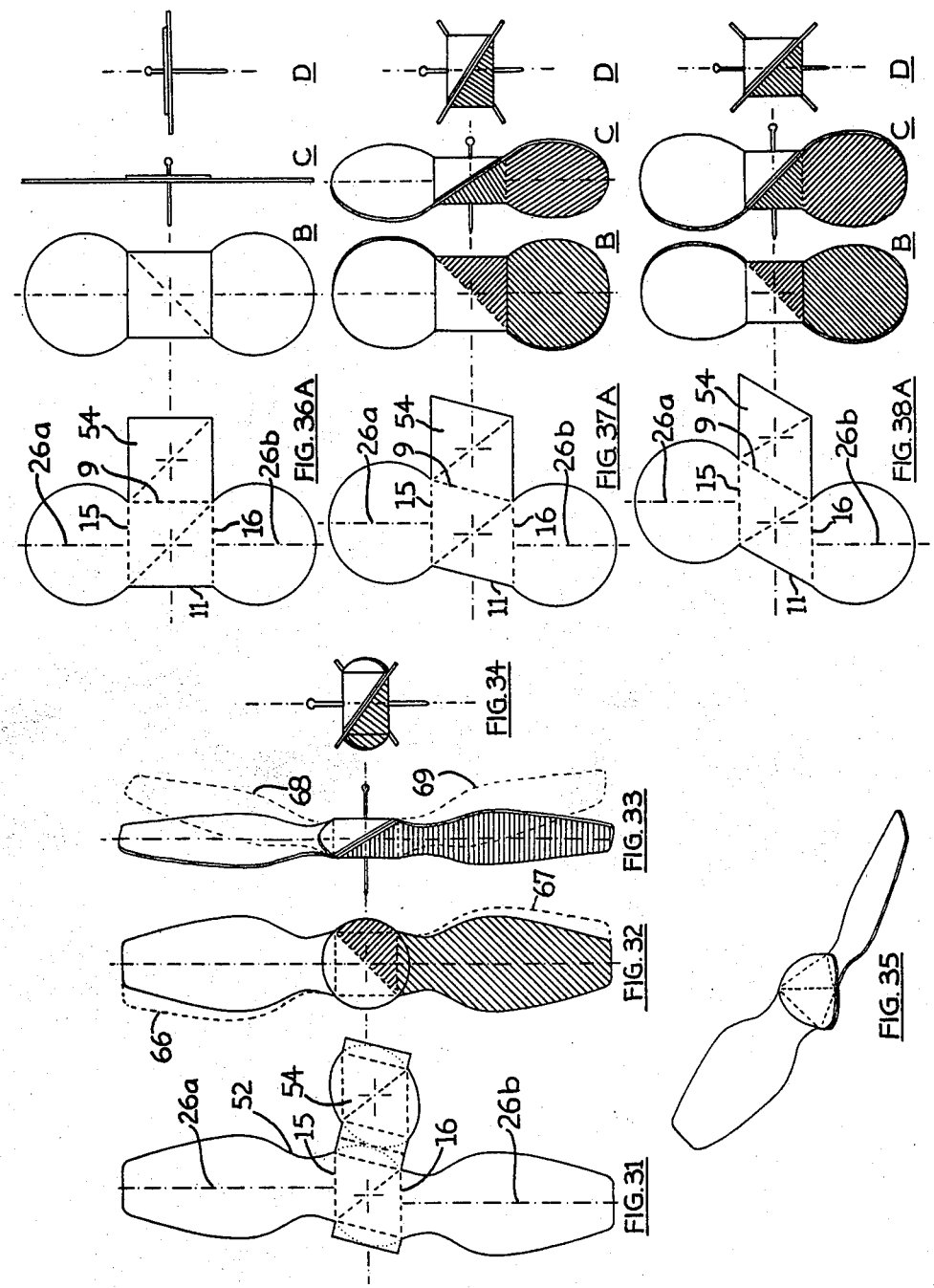

4,379,813

PROPELLERS AND WINDMILLS

FIELD OF THE INVENTION

This invention relates to propellers and windmills.

BACKGROUND OF THE INVENTION

It is known to carve propellers from solid substances and also to mould form propellers.

In a particular aspect this invention relates to a propeller blank of sheet material which can be formed into a propeller or windmill.

SUMMARY OF THE INVENTION

The present invention provides a propeller or a windmill blank comprising a planar sheet of material having markings defining, or being shaped to have, a central or hub region and two blades extending in opposite directions along imaginary lines; and wherein the blank has a marking or line of preferential folding inclined to the first mentioned lines which, when the blank is bent therealong, will result in pitch being applied to the blades.

PREFERRED FEATURES OF THE INVENTION

Dependent on the material of the blank, it may tend to naturally flatten out after such a bend is put in it. Hence it is preferred that means is provided to stabilize that bend. Such means may include a tab and projections and apertures associated with the tab and central or hub region which, when engaged will stabilize that bend. The tab may be joined to the central or hub region or may be separate or separable therefrom.

Alternatively, the tab may be bonded to the central or hub region by other means such as adhesive.

In this respect, stabilization seems to be improved if the material of the central or hub region on each side of the second mentioned line and said tab co-operate to form a polygon when viewed in a cross-section transverse to the second mentioned line. Further, this gives thickness to the hub which is beneficial as described below.

In a preferred instance said tab is bent or bendable so that it and the central or hub region form a tetrahedron. That tetrahedron is not necessarily based on equilateral triangles and, indeed it is preferred that it is based on triangles approximating, at one angle, to a right angle and in this last respect an angle of from 60° to less than 90° is preferred and 75° to 85° is more preferred. Desirably the tetrahedron is such that two opposite edges, which carry the blades, lie at about 45°±10° to one another. The most preferred angles of the triangles forming the tetrahedron are 70°±10°, 55°±5° and 55°±5°.

Most preferably the central or hub region and the tab have the shape of a rhomb or a rhomboid and by folding or bending about diagonals these may together form the tetrahedron.

A still further tab and associated projections and apertures may be provided to further stabilize that bend and/or to provide strength in the region of the hub.

The first mentioned lines may be in a single line but it is preferred that they are parallel such that when said pitch is so applied they come to lie in a single line or plane.

The radially outward shape of the blades is preferably based on an elipse such that when said pitch is so applied the blades will appear to lie on the pitch circle.

A slot is preferably provided in at least one of the central or hub region, the firstmentioned tab and said further tab which will be central when the blank is formed into a propeller. A drinking straw or other light weight tubular member may be pushed into that slot after flattening or being flattened in the process to provide a relatively non-rotating joint. The aforesaid thickness to the hub helps grip and improves stability. A rod member may be used instead of the tubular member but is not preferred. Thus, by spinning the straw by hand the propeller will turn and generate lift and can fly. Preferably, two of the central or hub region, said first mentioned tab and said further tab have such a slot and one thereof has a hole into which the straw may fit. That one is preferably an external one of the central or hub region, said first mentioned tab and said further tab.

The blades may require some additional bending to set the best angle for lift or for sustained flight. In this respect, it should be noted that maximum flight height and maximum flight time are not necessarily achieved at one setting angle. Further, a boomerang effect, return flight, may be obtained but this usually requires maximization of flight time.

The blade shape may be varied to suit lift and flight requirements. In general, it may be said that the blades should have a substantial part of their area adjacent the tip and a lesser part adjacent the root. Indeed, it is preferred that the blade is elongate in the region of the pitch circle. In some instances it is preferred that the blade is more elongate in respect of the leading edge than at the trailing edge. In the case of windmills the blade may extend over a major portion of the pitch circle.

Said sheet of material may be paper, card, cardboard, synthetic plastics sheet or metal. Generally a thickness of less than 1 mm is desirable.

Said sheet of material may be printed or otherwise marked on to indicate where it should be cut and/or bent and/or apertures.

Alternatively, said sheet of material may have been cut to shape and provided with markings, perforations or score lines to indicate where it should be cut and/or bent and/or apertured. Most desirably all holes and/or slots are preformed, all tabs and projections are cut out and all bend lines are prescored so that all a user need do is bend and fit projections into slots. For convenience in packaging it is generally preferred that the blank comprises a square or rectangular card which is perforated and scored to define the propeller or windmill and an unwanted portion thereabouts which will be torn off and discarded by a person assembling the propeller or windmill.

Several specific constructions of propeller blanks in accordance with this invention will now be described with the aid of the accompanying drawings.

DESCRIPTION OF THE VIEWS OF THE DRAWINGS

FIG. 1A is a plan view of a first propeller blank,

FIG. 1B is a side view of part of the blank of FIG. 1A,

FIGS. 2–7 are views showing how the blank of FIG. 1 can be formed into a propeller and used, FIG. 8 is a plan view of a second propeller blank, FIGS. 9 and 10 are views showing how the blank of FIG. 1 can be formed into a propeller, FIG. 11 is a plan view of a third propeller blank, FIGS. 12 and 13 are perspective views showing a propeller formed from the blank of FIG. 11, FIG. 14 is a plan view of a fourth propeller blank, FIGS. 15 and 16 are perspective views showing a propeller formed from the blank of FIG. 14, FIG. 17 is a plan view of a fifth propeller blank, FIGS. 18 and 19 are perspective views showing a propeller formed from the blank of FIG. 17, FIG. 20 is a plan view of a sixth propeller blank, FIGS. 21 and 22 are perspective views showing a propeller formed from the blank of FIG. 20, FIG. 23 is a plan view of a seventh propeller blank, FIG. 24 is an axial view showing a propeller formed from the blank of FIG. 23, FIG. 25 is a plan view of an eighth propeller blank, FIG. 26 is an axial view showing a propeller formed from the blank of FIG. 25, FIG. 27 is a plan view of a ninth blank which is a blank for forming a windmill, FIGS. 28, 29 and 30 are perspective views of a windmill fan and windmill formed from the blank of FIG. 27, FIG. 31 is a plan view of a tenth blank which is a blank for forming a windmill, FIG. 32 is a plan view of the blank of FIG. 31 after folding, trimming and bending, FIG. 33 is a side view of the blank of FIG. 31 after folding, trimming and bending.

FIG. 34 is another side view of the blank of FIG. 31 after folding, trimming and bending, FIG. 35 is a perspective view of a windmill fan formed from the blank of FIG. 31, and FIGS. 36–38A-D are schematic representations illustrating how various angular relationships in the blank affect pitch.

DETAILED DESCRIPTION WITH RESPECT TO THE DRAWINGS

The propeller blank 1 shown in FIGS. 1A and 1B is a sheet of material which has been stamped such as by a die cut press to define an outer unwanted portion 51 and an inner wanted portion 52 joined to the portion 51 by webs 53 which are easily breakable.

The portion 52, after separation from the portion 51 appears as shown in FIG. 1B and FIG. 2 and has a perimeter 2, a hole 3, slots 4, 5 and 6 and a slit 7. In addition, the portion 52 has score lines or marked lines indicated by dashes along lines 8, 9, 10, 11 and 12 indicating where it should be folded and score lines or marked lines 15 and 16 indicating where it is to be bent. The stamping out has defined propeller blades 17 and 18, tab parts 19 and 20, and 21, projections 22 and 23 and central region parts 24 and 25.

An imaginary line (shown as dash-dot line 26) bisects the blades 17 and 18. It will be explained later that there is preferably a separate line for each of blades 17 and 18.

It should be noted that the angle theta is 75°±10° and that the angle phi is 35°±10°.

The portion 52 is folded and projections inserted as shown in FIGS. 2-4 and it should be noted that in FIG. 3 parts 19, 20, 24 and 25 have formed a tetrahedron.

Thereafter a drinking straw 30 is inserted through the hole 3 and through the slots 4 and 6. In passing through the slots 4 and 6 the straw 30 is flattened as at 31.

Thereafter by twirling the straw 30 between the palms of the hands of a user the propeller and straw combination can be made to fly.

The propeller blank 41 shown in FIG. 8 is similar to that shown in FIGS. 1A and 1B and like numerals denote like parts. The differences are that unwanted portion 51 is either not present or not shown, parts 19 and 20 are on opposite sides of parts 24 and 25 to part 21, hole 3 is a star-cut in between the parts 24 and 25, slot 4 is between parts 19 and 20 and slit 7 is in part 20.

The manner of assembly of the blank 41 is understandable from FIGS. 9 and 11 and its manner of use is similar to the description in respect of FIGS. 1-7.

The blank of FIG. 11 and the propeller formed therefrom shown in FIGS. 12 and 13 is similar to that described with respect to FIGS. 8-10. The principal differences are the omission of projection 22 and slit 7 and that hole 3 is eye-shaped. The eye-shape is considered preferred as it will accommodate a range of sizes of drinking straws.

The blank of FIG. 14 and the propeller formed therefrom shown in FIGS. 15 and 16 is similar to that described with respect to FIGS. 11-13. The principal differences are the location of the projection 23 and the slot 5.

The blank of FIG. 17 and the propeller formed therefrom shown in FIGS. 18 and 19 is similar to that described with respect to FIGS. 14-16. The principal differences being that the blank comprises a portion 54 which carries slits 5 and 7 and portion 52 carries projections 22 and 23.

The propeller blank of FIG. 20 and the propeller formed therefrom shown in FIGS. 21 and 22 is similar to that described with respect to FIGS. 17-19. The principal difference is that projections 22 and 23 and slits 5 and 7 have been eliminated and instead portion 54, after bending as shown to the right in FIG. 20, is secured to the portion 52 by bonding in the areas 55 and 56 such as by heat or solvent welding or adhesive. Not all the areas 55 need to be bonded to the areas 56.

The blank of FIG. 23 and the propeller formed therefrom shown in FIG. 24 is similar to that described with respect to FIGS. 14-16. The principal difference is that the curvature of the blades at 57 and 58 is based on an elipse rather than on a circle so that when pitch is applied the projected shape of the regions 57 and 58 will be circular as seen in FIG. 24.

The blank of FIG. 25 and the propeller formed therefrom shown in FIG. 26 is similar to that described with respect to FIGS. 17-19 except that the regions 57 and 58 are based on an elipse and project to be based on a circle as part of the propeller as described with respect to FIGS. 23 and 24 and the leading edges 59 and 60 of the blades extend more than the trailing edges 61 and 62. The elongation of the blade seems to produce greater gyroscopic stability and a boomerang, return to user, effect.

The blank of FIG. 27 and the windmill fan formed therefrom shown in FIGS. 28-30 is similar to the blank and propeller described with respect to FIGS. 25 and 26. The principal differences are that the blades are extremely elongate in the direction of the pitch circle and the hole 3 is either absent in the blank itself or very small.

The blank of FIG. 31 and the windmill formed therefrom shown in FIGS. 32-35 is similar to that shown in FIGS. 20-22.

The principal difference in form is that portion 54 is integral with portion 52 and that lines 26a and 26b are parallel and are not in a straight line. This last has been found desirable in that in the folding operation the blades are displaced from the dash line positions 66 and 67 in FIG. 32 so that the lines 26a and 26b lie in a plane. Further, the folding operation will result in the blades being inclined to the axis as shown in dash lines 68 and 69 in FIG. 33 but bending about the lines 15 and 16 can correct this.

The feature of the parallelity of the lines 26a and 26b and the spacing is explained with respect to FIGS. 36-38.

In that respect, the shape of the central or hub region defined by 9, 11, 15 and 16 and the shape of portion 54 affect pitch and the spacing of lines 26a and 26b. Thus, if that shape is square as shown in FIG. 36 lines 26a and 26b are not spaced but no pitch results, where that shape is a rhomb of acute angles 60° and obtuse angles 120° as shown in FIG. 38 the lines 26a and 26b are substantially spaced, the tetrahedron formed is based on equilateral triangles, and pitch is 45° (see FIG. 38D). A pitch of 45° is probably excessive.

More preferred is if that shape is a rhomb as shown in FIG. 37 with acute angles of 75°±10° and obtuse angles of 120°±10°. In the instance of 75° and 120° a pitch angle of about 60° is produced.

Different blades may be used.

The above described blanks may be supplied cut out or printed and, concerning printing, can be printed on cartons such as breakfast cereal cartons or other cartons with or without perforations enabling separation from unwanted material.

The propellers which can be formed flies well and the windmills turn well and all are simple and cheap to make.

Modifications and adaptations may be made to the above described without departing from the spirit and scope of this invention which includes every novel feature and combination of features disclosed herein.

The claims form part of the disclosure of this specification.

I claim:

1. A propeller or windmill blank comprising a planar sheet of material having markings defining a central region and two blades extending in opposite directions along imaginary lines; and wherein the blank has a marking or a line of preferential folding or bending inclined to the imaginary lines which, when the blank is folded or bent therealong, will result in pitch being applied to the blades; a portion having a marking or line of preferential folding or bending on each side of which marking or line the portion is of generally triangular shape, and means for stabilizing a fold or bend on the first said marking or line which will result in pitch being applied, a fold or bend on the second said marking or line and for securing said portion to said central region such that said portion and said central region when so secured together define a hub region of generally tetrahedral shape from edges of which said blades project.

2. A propeller or windmill as claimed in claim 1, wherein said means includes a projection on one, and an aperture adapted to receive said projection in the other, of said portion and central region.

3. A propeller or windmill as claimed in claim 1 or claim 2, wherein said portion is separate from said central region when not secured thereto.

4. A propeller or windmill as claimed in claim 1 or claim 2, wherein said portion is defined by a tab extending from said central region.

5. A propeller or windmill as claimed in claim 4, wherein said tab is integrally connected to and formed with said central region.

6. A propeller or windmill blank as claimed in claim 1 wherein the sides of the generally tetrahedral shape are triangles of angles 70°±10°, 55°±5° and 55°±5°.

7. A propeller or windmill blank as claimed in claim 1, wherein said lines are parallel and spaced such that when said pitch is so applied the lines line in a plane.

8. A propeller or windmill blank as claimed in claim 4 wherein the central region and the tab each have the shape of a rhomb, wherein the central region and the tab are joined together along a marking or line of preferential folding or bending and such that the rhombs when folded or bent about the third said marking.

9. A propeller or windmill blank as claimed in claim 1, including a slot in at least one of the central region and said portion for receiving a lightweight longitudinally extending member.

10. A propeller or windmill as claimed in claim 9, wherein said slot is shaped to grip a drinking straw.

11. A propeller or windmill formed from a blank comprising a planar sheet of material having markings defining a central region and two blades extending in opposite directions along imaginary lines; and wherein the blank has a marking or line of preferential folding or bending inclined to the imaginary lines which, when the blank is folded or bent therealong, will result in pitch being applied to the blades; a portion having a marking or line of preferential folding or bending on each side of which marking line the portion is of generally triangular shape, and means for stabilizing a fold or bend on the first said marking or line.

12. A propeller or windmill as claimed in claim 11, wherein said means includes a projection on one received in an aperture in the other of said portion and central region.

13. A propeller windmill as claimed in claim 11 wherein said portion is entirely separate from said central region when not secured thereto.

14. A propeller or windmill as claimed in claim 11 wherein said portion is defined by a tab extending from said central region.

15. A propeller or windmill as claimed in claim 14, wherein said tab is integrally connected to and formed with said central region.

16. A propeller or windmill as claimed in claim 11, wherein the sides of the generally tetrahedral shape are triangles of angles 70°±10°, 55°±5° and 55°±5°.

17. A propeller or windmill as claimed in claim 11 wherein said lines lie in a plane.

18. A propeller or windmill as claimed in claim 14 each have the shape of a rhomb, wherein the central region and the tab are joined together along a marking or line of preferential folding or bending and such that the rhombs when folded or bent about the third said marking or line and about diagonals thereof, said diagonals being or the first said marking or line and the second said marking or line, and brought together define together said hub region of generally tetrahedral shape.

19. A propeller or windmill as claimed in claim 11, including a slot in at least one of the central region and said portion for receiving a lightweight longitudinally extending member.

20. A propeller or windmill as claimed in claim 19, wherein said slot is shaped to grip a drinking straw.

21. A propeller or windmill as claimed in claim 20, wherein a drinking straw or other lightweight tubular longitudinally extending member is received in and gripped by said slot.

22. A propeller or windmill as claimed in claim 11, wherein the blades have a substantial part of their area adjacent the tip and a lesser part adjacent the root.

* * * * *